(12) United States Patent
Bromberg et al.

(10) Patent No.: US 8,677,949 B2
(45) Date of Patent: *Mar. 25, 2014

(54) FUEL MANAGEMENT SYSTEM FOR VERY HIGH EFFICIENCY FLEX FUEL ENGINES POWERED BY METHANOL AND GASOLINE

(75) Inventors: Leslie Bromberg, Sharon, MA (US); Daniel R. Cohn, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 707 days.

This patent is subject to a terminal disclaimer.

(21) Appl. No.: 12/648,082

(22) Filed: Dec. 28, 2009

(65) Prior Publication Data

US 2010/0174470 A1 Jul. 8, 2010

Related U.S. Application Data

(63) Continuation of application No. 12/600,762, filed as application No. PCT/US2008/083100 on Nov. 11, 2008.

(60) Provisional application No. 60/987,124, filed on Nov. 12, 2007, provisional application No. 61/100,287, filed on Sep. 26, 2008.

(51) Int. Cl.
*F02B 43/08* (2006.01)

(52) U.S. Cl.
USPC .......................................................... 123/3

(58) Field of Classification Search
USPC ..... 123/1 A, 299, 304, 198 A, 525, 527, 528, 123/564, 568.11
See application file for complete search history.

(56) References Cited

U.S. PATENT DOCUMENTS

| | | | |
|---|---|---|---|
| 5,425,332 A * | 6/1995 | Rabinovich et al. | ............. 123/3 |
| 6,655,324 B2 | 12/2003 | Cohn et al. | |
| 2004/0035395 A1 | 2/2004 | Heywood et al. | |
| 2005/0008904 A1 | 1/2005 | Suppes | |
| 2005/0198900 A1 | 9/2005 | Nashburn et al. | |
| 2005/0210877 A1 | 9/2005 | Rabinovich et al. | |
| 2005/0230659 A1 | 10/2005 | Hampden-Smith et al. | |
| 2007/0129242 A1 | 6/2007 | Xu et al. | |

OTHER PUBLICATIONS

Shudo, T., An HCCI combustion engine system using on-board reformed gases of methanol with waste heat recovery: ignition control by hydrogen, Inter. J. Vehicle Design, pp. 206-226, vol. 41, (2006).

Xu, Y. et al., Catalytic Properties of Ni3Al intermetallics for methanol decomposition, Materials Transactions, vol. 45, p. 3177-9, (2004).

Bromberg, L. et al., Calculations of knock suppression in highly turbocharged gasoline/ethanol engines using direct ethanol injection, MIT Lab. For Energy and the Environment report(LFEE-01-2006), pp. 1-17, (2006).

PCT International Search Report, Application No. PCT/US08/83100, Jan. 9, 2009.

* cited by examiner

*Primary Examiner* — Hung Q Nguyen
(74) *Attorney, Agent, or Firm* — Sam Pasternack; MIT Technology Licensing Office (57) ABSTRACT

Turbocharged or supercharged spark ignition engine. The engine includes a source of methanol for direct injection of methanol into the engine and for delivering a portion of the methanol to a reformer for generating a hydrogen-rich gas.

27 Claims, 6 Drawing Sheets

FIG. 10

FUEL MANAGEMENT SYSTEM FOR VERY HIGH EFFICIENCY FLEX FUEL ENGINES POWERED BY METHANOL AND GASOLINE

PRIORITY CLAIM

This application is a continuation of nonprovisional application Ser. No. 12/600,762 filed Nov. 18, 2009 which is a national phase application under 35 U.S.C. §371 of PCT/US2008/083100 filed Nov. 11, 2008 which claims priority to provisional application Ser. No. 61/100,287 filed Sep. 26, 2008 and to provisional application Ser. No. 60/987,124 filed Nov. 12, 2007, the contents of which are incorporated herein by reference.

BACKGROUND OF THE INVENTION

This invention relates to a high efficiency, flexible fuel engine and more particularly to an engine using reformer enhanced methanol operation.

There is an increasing need for improving the efficiency of internal combustion engines and providing alternative fuels to gasoline. Methanol is an attractive alternative fuel because it is readily made by gasification processes from a variety of feedstocks. These feedstocks include natural gas, municipal and industrial waste, agricultural and forestry wastes, biomass sources such as switchgrass and coal.

Methanol can also provide a means to substantially increase engine efficiency through exceptional knock suppression capability and exceptional ease of reformation into a hydrogen-rich gas which can be used to improve engine efficiency.

It is an object of the present invention to optimize the efficiency and flexibility of methanol use in spark ignition engines. Both engine operation with methanol from a single tank and two tank flexible fuel engines in which methanol is stored in one tank and gasoline or another fuel is stored in a second tank, are considered.

SUMMARY OF THE INVENTION

In one aspect, the invention is a turbocharged or supercharged spark ignition engine including a source of methanol for direct injection of methanol into the engine and for delivering a portion of the methanol to a reformer for generating a hydrogen-rich gas at lower engine torque values. The hydrogen-rich gas is introduced into the engine to extend the limit of lean operation. The engine operates at a substantially stoichiometric fuel/air ratio during part of a drive cycle and at a lean fuel/air ratio during other parts of the drive cycle.

In yet another aspect, the invention is a fuel management system for a spark ignition engine in which a fuel is contained in a first tank and methanol is contained in a second tank. The methanol from the second tank is directed to a reformer which produces a reformate that is used along with the fuel from the first tank in the engine at low loads. The engine operates at an ultra-lean mode when the reformer is used; and when the reformer is not used, the engine operates with a stoichiometric air/fuel ratio. At high loads methanol injection is used to prevent knock. In a preferred embodiment, a three-way catalyst is used to control emissions when the engine is operated with a stoichiometric air/fuel ratio. The invention describes a control system to maximize the impact of methanol use and to provide control that determines the rate of methanol consumption

DESCRIPTION OF THE PREFERRED EMBODIMENT

A very high efficiency spark ignition engine can be made possible by the combination of the special properties of methanol which facilitate ultra dilute operation at a low loads together with highly turbocharged, high compression ratio operation at a substantially stoichiometric fuel/air ratio at high loads. Stoichiometric operation allows use of a three-way catalytic converter for emissions control and provides high power density engine operation. The ultra dilute operation is made possible by addition of hydrogen-rich gas, which is produced by reforming a fraction of the methanol. Methanol is an especially easy fuel to reform. The hydrogen-rich gas can be used to enhance flame speed, extend the lean limit and thus allow for ultra lean or heavy EGR operation at low load. The resulting higher ratio of specific heats and reduced pumping losses could increase efficiency by more than 12% if ultra lean operation is used.

The highly turbocharged, high compression ratio operation is facilitated by the exceptionally high knock resistance of methanol or ethanol when it is directly injected (see MIT Laboratory for Energy and the Environment report LFEE-01-2006). The combination of engine downsizing, which is enabled by highly turbocharged operation, and the use of a high compression ratio can increase efficiency by around 30%. Thus the total efficiency gain of an ultra lean direct injection methanol engine relative to a conventional gasoline engine (port fueled, naturally aspirated) could be greater than 40%. This potential efficiency gain (on a miles/BTU basis or km/gm $CO_2$ produced) is around 10% greater than that of clean diesels or that of typical gasoline/electric hybrid vehicles at an incremental cost (around $ 1,300) which is around a third of that for these present high efficiency engine options. This highly cost effective approach for obtaining high efficiency could be particularly important for China and other rapidly developing countries. Moreover, China has recently made a major commitment to consideration of methanol as an alternative fuel to gasoline. Methanol can be readily produced from China's large coal deposits. It can also be produced from natural gas, various forms of biomass including municipal waste and from industrial waste.

Although the turbocharged operation allows very high engine efficiency at high loads, operation at light loads is fundamentally inefficient at stoichiometric conditions. This is because of the friction losses (particularly throttling) at low load operation become a substantial fraction of the torque produced by the engine. Operation with large amounts of diluent (either EGR or lean operation) can reduce these losses, resulting in increased efficiency.

It is well known that hydrogen addition can improve combustion stability in spark ignited engines. Acceptable combustion stability requires low enough variations in combustion rate within each cylinder from cycle to cycle, and hence low enough variation in torque. Combustion stability is quantified by the Coefficient Of Variation (COV) in the indicated mean effective pressure (IMEP). The indicated mean effective pressure is the work transferred to the piston divided by the displaced volume. The COV of indicated mean effective pressure must be kept below a few (2-5) percent at all operating conditions. Combustion stability deteriorates as the engine operates leaner, or with higher levels of exhaust gas recirculation (EGR). Hydrogen, and CO, addition improves combustion stability by speeding up the combustion process. The more hydrogen, and CO, added the greater the improvement in combustion stability.

Pollutant emissions would be suppressed to very low levels by operation at a sufficiently lean operation at low loads. Alternatively, operation with very heavy EGR can achieve the same purpose. With high dilution level operation from lean operation and/or EGR the engine nitrogen oxide (NOx) emissions would be sufficiently low so that vehicle NOx emissions could meet stringent air pollutant regulations without need for a three way catalytic converter. At higher loads the engine would be operated with a stoichiometric fuel/air ratio and emissions would be controlled by use of a three way catalytic converter.

For lean operation the hydrogen-rich gas addition can be added in such an amount that $\phi$ (the equivalence ratio) could be reduced to less than 0.5 and preferably less than 0.4. The hydrogen-rich gas can be used to stabilize the ignition characteristics of the fuels, because of the high flame propagation speed of the hydrogen-rich gas, as well as the heat content in the hydrogen-rich gas when it is in the form of a reformate of a hydrocarbon fuel. The hydrogen-rich gas can be generated onboard the vehicle by the use of a reformer, employing either partial oxidation reactions or methanol pyrolysis (thermal decomposition). The fraction of methanol that is to be reformed into hydrogen-rich gas may exceed 30% at some points in the drive cycle, especially at the lowest loads. Because of the ease of reforming methanol, it may be possible to utilize waste heat in the exhaust gas to supply a substantial fraction of the heat required for the reforming process. A plasmatron reformer may be employed to facilitate rapid reformer startup using plasma assistance. After the reformer has been started up, reformer operation could be switched to pyrolytic reforming (thermal decomposition) using waste heat in the exhaust gas with reduced or eliminated plasma assistance.

The conversion of a sufficient amount of methanol into hydrogen-rich gas by the reformer could also be used to facilitate cold start of the engine.

In one embodiment, the reformate that is introduced into the engine is hot (no use of an intercooler to reduce the temperature increase provided by reforming) and the increased temperature of the cylinder charge due to the hot reformate increases the flame speed, stabilizing combustion further. Since higher temperatures increase the propensity for knock, the hot reformate would preferably be used only below a certain torque level.

In another embodiment, in the case of heavy EGR, the use of hydrogen-rich gas can also be used to stabilize the combustion. Although allowable dilution is less in the case of EGR, EGR is more effective at minimizing nitrogen oxides production because of its lower value of $\gamma$. It is possible to use either cold EGR, but hot EGR has the advantages of increasing the charge temperature and thus the flame speed and the stability of combustion.

Stabilization of the ignition phase can also be provided by increased compression ratio operation. At a higher compression ratio, cylinder charge temperatures at sparking are higher than in the case of lower compression ratios because of compression heating. Thus, the need for hydrogen-rich gas addition in either lean or heavy EGR operation can be minimized. Operation at a compression ratio of at least 11 and preferably 12 or higher is preferred.

Improved fuel efficiency, over a cycle and in particular at low loads, can be achieved by decreasing the region in the engine map that operates with throttling. Through the use of substantial engine downsizing the region in the engine map that requires throttling is minimized.

Even though the engine has been downsized, the large range of loads can still be achieved by the use of heavy turbocharging or supercharging. Turbocharging or supercharging operation with inlet manifold at 2 bar or preferably higher than 2.5 bar results in a large potential for engine downsizing together with high compression ratio operation. The engine could be operated at compression ratios in the 12 to 15 range. Use of direct injection of methanol has shown capabilities of increasing the manifold pressure by a factor of 4 or more, through the use of knock models (see MIT Laboratory for Energy and the Environment Report RR-01-2006). Ideally, engine downsizing of 2.5 or more (at comparable engine torque/power) can be achieved through modest use of methanol.

The ultra dilute operation is made possible by addition of hydrogen-rich gas ($H_2$+CO) produced by on-board methanol reforming. Methanol is an especially easy fuel to reform, and thermal decomposition can be used instead of partial oxidation. Thermal decomposition (without the use of oxygen) is preferred, as the reformate is void of nitrogen and is thereby considerably more effective in extending the lean limit as the absence of the nitrogen diluent avoids the negative effect on the flame speed of the presence of such diluent in the cylinder charge. The reformate consist of hydrogen, carbon monoxide and other compounds in relatively small concentrations. In addition, the generation of hydrogen-rich gas from methanol pyrolytic reforming has the advantage that the reformate is not diluted by nitrogen and other products that result from partial oxidation, for example. The CO produced in the methanol reforming has a positive effect on the flame speed propagation. The hydrogen-rich reformate can be used to enhance flame speed, extend the lean limit and thus allow for ultra lean or heavy exhaust gas recirculation (EGR) operation at all loads, but particularly at low loads where reduction of friction and heat loss to the engine can increase the engine efficiency by more than ~10%.

Methanol reformation (steam reforming or thermal decomposition) has a further advantage: thermal decomposition of methanol, although relatively easy, is an endothermic reaction. Thus the reformation can be envisioned as means of capturing the waste heat of the exhaust, further increasing the overall efficiency of the system. For example, this has been considered by Shudo for a homogeneous charge compression ignition (HCCI) engine (T. Shudo, *An HCCI combustion engine system using on-board reformed gases of methanol with waste heat recovery: ignition control by hydrogen, Inter J Vehicle Design* 41 206-226 (2006)]. Large increases in diluent tolerance (for both lean operation and operation with EGR) have been obtained by the use of hydrogen, and the use of hot reformate increases the tolerance further.

The fueling of the engine with the hydrogen-rich gas can be carried out using port fuel injection. During part of the operating time the engine may be fueled directly with methanol alone. At other times both hydrogen-rich gas and methanol are used. During part of the cold start period the engine may be fueled with hydrogen-rich gas alone.

A reformer enhanced DI spark ignition engine could also operate on gasoline or other various fuels in place of or in addition to methanol.

An important issue with this approach is that the operation at lean conditions results in relatively low exhaust temperatures. The use of a thermal decomposition reformer may be compromised by reduced exhaust temperature. For this embodiment, it is not necessary to operate the reformer in order to have high hydrogen yields, as is required for fuel cell applications. It is possible to optimize the reformer by trading off hydrogen yield with minimization of coke generation on the catalysts. Under these circumstances, more methanol would have to be processed by the reformer, increasing the space velocity, to compensate for the decreased yields. Low temperature conversion, without soot, has been obtained using $Ni_3Al$ reformer catalysts [Ya Xu, S Kameoka, K. Kishida et al., *Catalytic properties of $Ni_3Al$ intermetallics for methanol decomposition, Materials Transactions* 45 3177-9 (2004); also US patent applications *Intermetallic compound Ni3Al catalyst for reforming methanol and methanol reforming method using same*, US 20070129242], among others.

Onboard reforming provides high temperature hydrogen-rich gas (approximately 700-1000° C. for partial oxidation, around 300C for the case of endothermic reforming). Systems for using this gas generally cool it in order to minimize the contribution to knock and to maximize the volumetric efficiency. However, higher temperature of the air/fuel mixture in the vicinity of the spark (which results in the 0-10% burn fraction of the fuel) can promote significantly higher flame speed for increased combustion stability. Thus it is advantageous if the hydrogen-rich gas addition is such as to create a non-uniform distribution with greater amounts in the region close to the spark and also that the hydrogen-rich gas is hot. Since the total amount of hydrogen-rich gas is small, the loss of volumetric efficiency is minimized. Injection of hot hydrogen-rich gas for the improvement of combustion stability was not taught in U.S. Pat. No. 6,655,324 which considered the use of hydrogen-rich gas to increase combustion stability but not the use of high temperature nor the use of inhomogeneous distribution of the hot hydrogen-rich gas. The temperature of the hydrogen-rich gas could be regulated so as to obtain the most advantageous tradeoff between achieving higher flame speed and contributing to the increased production of NOx (through higher combustion temperatures). It is preferred that the temperature of the hydrogen-rich gas that is introduced into the engine be between 300 and 700 degrees C.

Use of high temperature reformate may also be useful in the case of uniform hydrogen addition.

Physical separation can also help establish and maintain the non uniform distribution. The non-uniform distribution is also referred to as "stratification." If there is sufficient swirl, cyclone activity may drive hot reformate towards the center (and maintain it there), while cold hydrogen-rich gas will be driven towards the periphery (and maintained there). The reformate from a partial oxidation reaction is hot, on the order of 900° C. (1173 K), and has substantially lower density than cooler air. Similarly, cool hydrogen-rich gas is heavier than the air, and thus denser. If the swirl is such that the speed of the gas is at 3 m/s, the corresponding centrifugal acceleration is on the order of 200 $m/s^2$ (or about 20 g's). The heavier fluids will be driven towards the periphery, while the hotter, lighter ones towards the axis. Thus the hot reformate will concentrate on the axis where it is preferred for flame propagation enhancement, and the colder hydrogen-rich gas will drift towards the periphery where it is needed to prevent knock due to the unburnt gas region. The separation process can thus be aided by thermal stratification.

Thus, hydrogen stratification may be achieved by not pre-mixing hydrogen-rich gas with the air, but by appropriately timed and appropriately placed hydrogen introduction close to the inlet valve. This would require using a pipe and pockets to deliver the hydrogen-rich gas to the region or regions close to the inlet valve.

Figure 1:
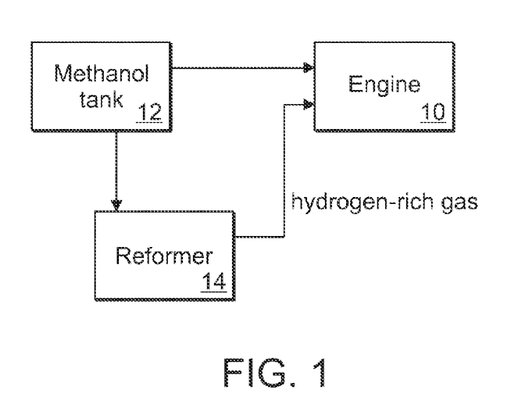
FIG. 1. is a schematic illustration of an embodiment of the invention in which an engine runs on methanol and/or a hydrogen-rich gas.

With reference first to FIG. 1 an internal combustion engine 10 operates on methanol from a methanol tank 12 and also upon a hydrogen-rich gas from a reformer 14.

Figure 2:
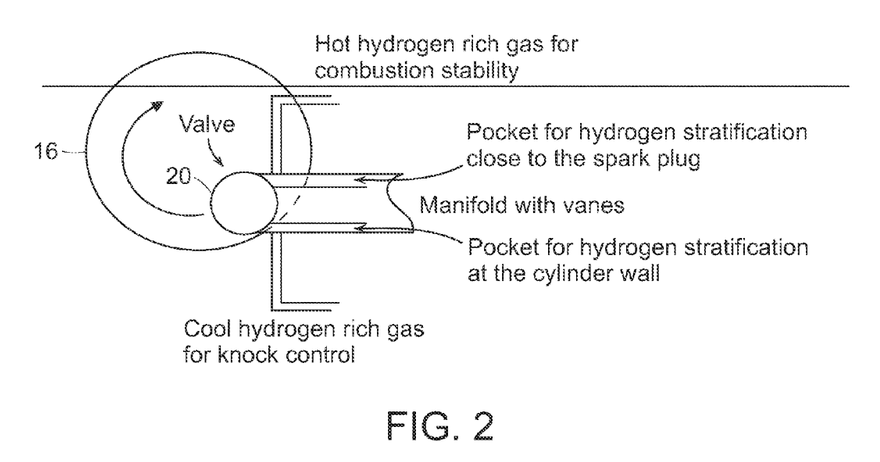
FIG. 2 is a schematic illustration of an embodiment of the invention for lean operation and for knock control.

In an embodiment, shown in FIG. 2, the hydrogen-rich gas and the air to the cylinder 16 are not mixed until they enter the cylinder. The possibility of generating flammable or even explosive mixtures outside the cylinder, which could be a hazard, is prevented. This is particularly useful when large amounts of hydrogen-rich gas are required in the cylinder.

Figure 3:
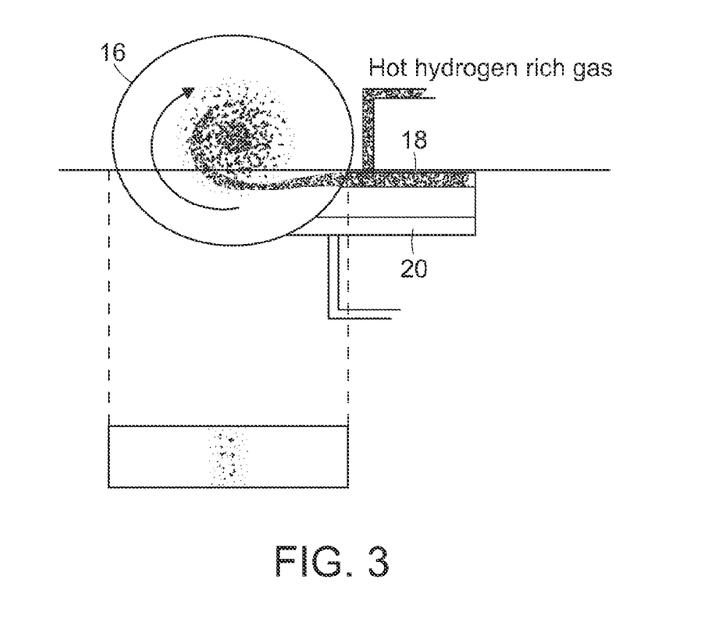
FIG. 3 is a schematic illustration of an embodiment of the invention for injecting hot hydrogen-rich gas into the engine.

A possible method for stratification of the hydrogen-rich gas when the cylinder 16 turbulence is small is shown in FIG. 3. Hydrogen-rich gas is injected into a pocket 18 close to the valve 20. Hydrogen stratification is obtained by injecting at different pockets in the inlet manifold. For the present discussion, two pockets are considered, one (18) for injection of the hydrogen-rich gas towards the axis of the cylinder 16 and another one (20) for injection close to the wall. The desired amount of hydrogen is injected into the pocket, which when the valve opens is admitted into the cylinder.

The swirl induced by the inlet can be used to achieve the stratification. Thus, the hydrogen-rich gas is inducted into the cylinder such that when the swirl is established the hydrogen-rich gas in located in the vortex of the swirl. If the spark is at the vortex of the swirl, then if turbulence and convection do not result in overall mixing of the gaseous charge, the spark will ignite the region with highest concentration of hydrogen-rich gas. This is shown in FIG. 3. The top of the figure shows when the charge is being inducted into the cylinder, and the bottom is a cross sectional view of the hydrogen-rich gas distribution desired near the moment of ignition.

In the above methods it is important to minimize tumble, as the flow would result in convection of the hydrogen-rich gas away from where it is desired. Alternative methods of introducing the hydrogen-rich gas using tumble can be designed. However, although stratified, the hydrogen-rich gas is in an annular region, resulting in improved performance when compared with a homogeneous mixture but resulting in less than ideal performance when compared with better stratification.

If 30% conversion of the gasoline into homogeneously added hydrogen-rich gas addition is required for combustion stability of $\phi$~0.5 air-fuel mixtures, but if only 10% of the burn needs to be enhanced with hydrogen-rich gas, then only 3% of the fuel needs to be converted into hydrogen-rich gas if the hydrogen-rich gas could be ideally stratified. Thus, large decreases in the amount of hydrogen-rich gas requirement could be achieved.

For a hydrogen requirement where the energy content of the hydrogen-rich gas is 20-30% of the fuel, the size of the pockets 18 and 20 needs to be on the order of 10% of the volume of the cylinder. If stratification reduces the amount hydrogen-rich gas that needs to be provided to a fraction of the 20-30%, the volume of the pocket needs to be only a few percent of the volume of the cylinder. Even if the hydrogen-rich gas is hot, as would be the case for combustion stability enhancement, the volume of the pocket is small and is a small fraction of the volume of the inlet manifold.

The use of hot reformate, stratified operation and thermal decomposition in a methanol fueled engine can reduce reforming losses to a small fraction of the gain due to ultralean operation.

For direct injection, it may be required to use either timed introduction of the hydrogen-rich gas (which would require a fast acting valve, since the air injection occurs in about half a revolution of the engine (for an engine rotating at about 4000 rpm, corresponding to about 10 milliseconds, and it would be desirable to control hydrogen-rich introduction into the engine at a rate faster than this).

The reformer enhanced direct injection spark ignition engine concept described above may be employed with other fuels in addition to or instead of methanol. These fuels include gasoline and ethanol.

The use of injection of hot reformate employing either a non stratified or stratified distribution could also be used to increase efficiency in methanol engines which do not use direct injection. The hot reformate would be used at low loads to enable ultra lean operation and would be reduced or eliminated at high loads to prevent knock and enable the highest possible power density operation and to allow use of a three way catalytic converter. This approach could also be applied to other fuels including ethanol and gasoline.

Another embodiment of the invention involves the use of methanol in a second tank to increase the efficiency of operation of a flexible fueled engine that is also powered by gasoline or some other fuel. Ultra lean engine operation enabled by onboard reformer generated hydrogen-rich gas could provide an important option for increasing engine efficiency. It could enable an efficiency gain of 10% to 20% by reducing throttling losses and increasing the ratio of specific heats. However, onboard conversion of presently used fuels such as gasoline into hydrogen-rich gas requires relatively complicated, inefficient and costly reformers [see, for example, plasma-based gasoline reformers or catalytic based partial oxidation gasoline reformers] In contrast methanol is easily reformed using thermal decomposition which can make use of the energy in exhaust heat.

The invention discloses how the efficiency gain can be maximized and how flexibility can be provided to the driver to control the methanol consumption rate and tradeoff between methanol consumption, increased power and increased efficiency.

Figure 4:
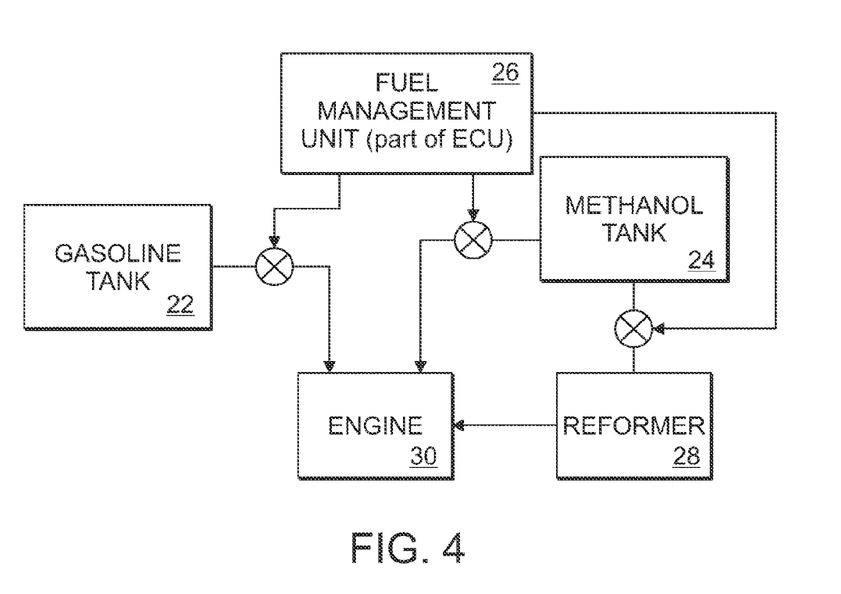
FIG. 4 is a schematic illustration for an embodiment of the invention including both a gasoline tank and a methanol tank.

FIG. 4 shows a schematic diagram of a two tank methanol reformer enhanced engine that uses a fuel such as gasoline in a first tank 22 and methanol in a second tank 24. The methanol in the second tank 24 can be directed by a fuel management control unit 26 to either a reformer 28 or directly to an engine 30 or both. The gasoline and methanol can both be port-fuel injected, directly injected or a combination of port fuel of gasoline and direct fuel injection of methanol can be used.

Figure 5:
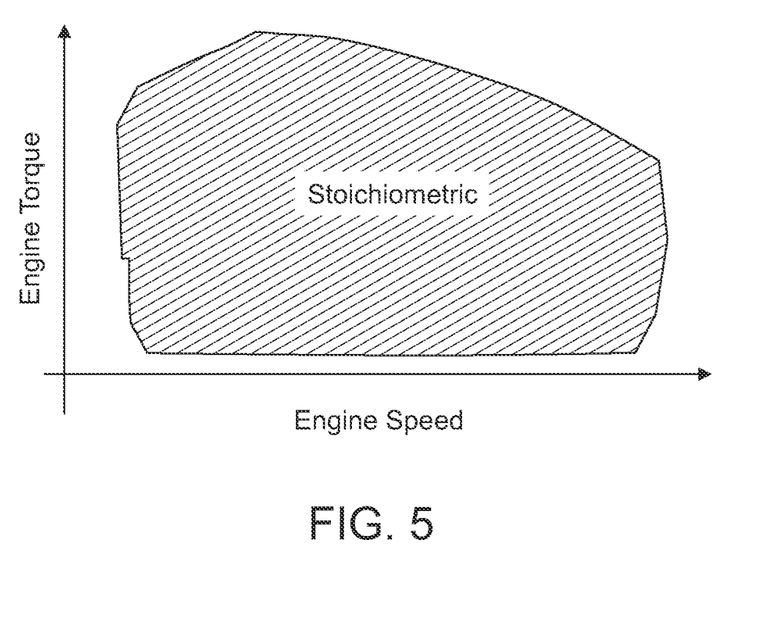
FIG. 5 is a graph of engine torque versus engine speed for a conventional engine operating at a stoichiometric air/fuel ratio over all or most of the engine map.
Figure 6A:
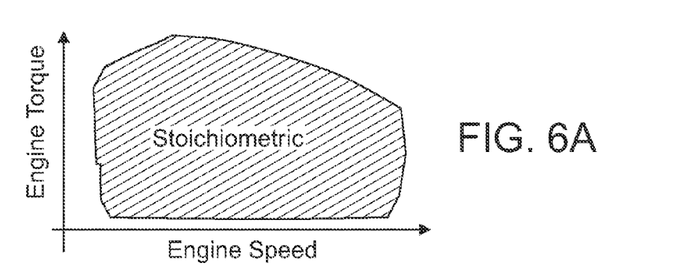
FIGS. 6a-d are graphs of engine torque versus engine speed for a conventional engine modified so that it operates in different modes with hydrogen-rich gas.
Figure 6B:
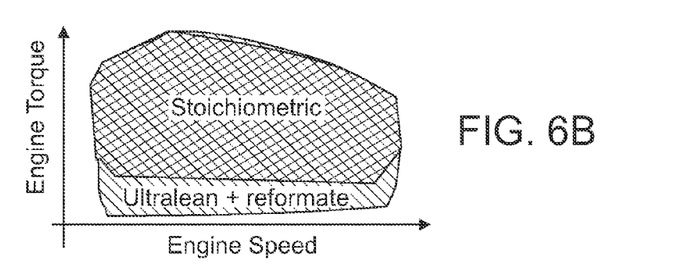
Figure 6C:
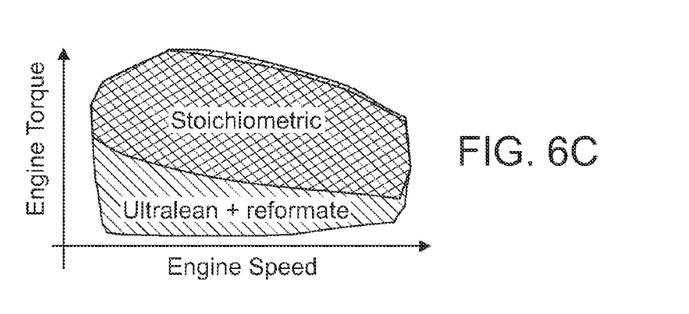
Figure 6D:
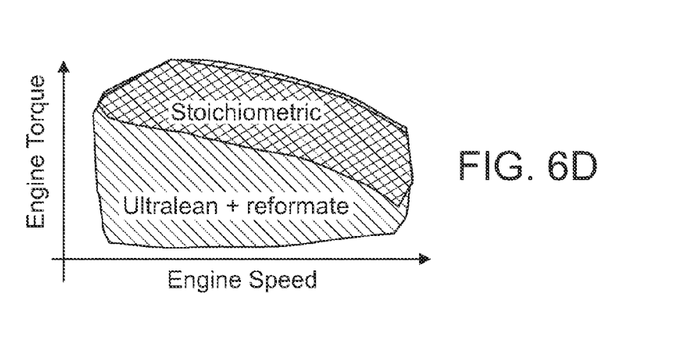

FIG. 5 shows a conventional engine, which operates with a stoichiometric air/fuel ratio over all or most of the engine map (with the exception of highest loads, where it could operate rich to avoid knock)

FIGS. 6a-d show a preferred embodiment, where the region of the engine map where lean operation is employed is changed under the guidance of the operator or the automatic engine management system. The amount of reformate used to enable ultra lean operation and increase efficiency is varied. With increased use of hydrogen-rich gas enabled lean operation over a wider region of the map, it is necessary to increase the amount of reformate provided, and thus increase the methanol utilization. In order to avoid the need for lean NOx aftertreatment, it is necessary to operate at air/fuel ratios greater than about 2 ($\lambda$>2). Ultra lean operation refers to lean stoichiometries that do not require NOx aftertreatment.

Figure 7:
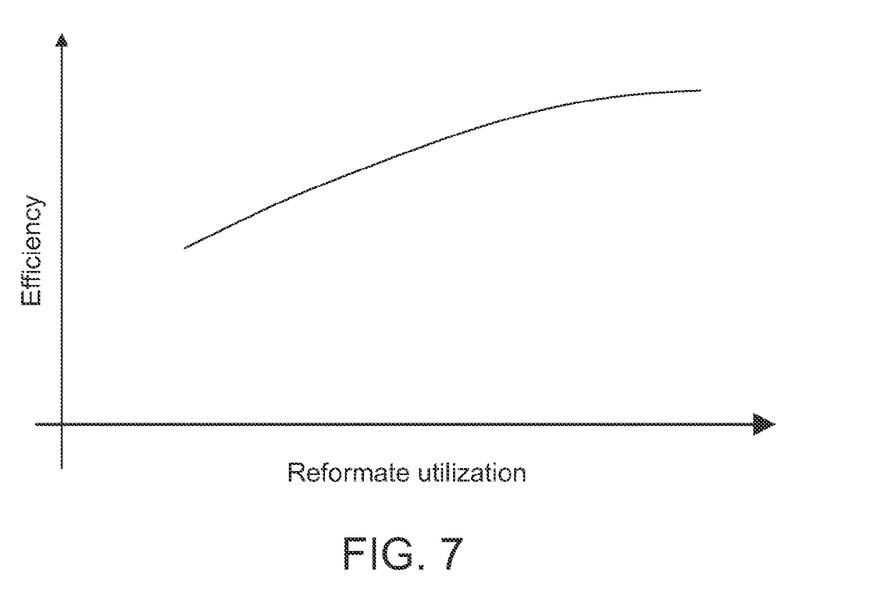
FIG. 7 is a graph of efficiency versus reformate utilization illustrating the trade-off between increased engine system efficiency and increased methanol utilization.

FIG. 7 schematically shows the tradeoff between increased engine system efficiency and increased methanol utilization. The engine system includes the engine and the reformer.

Figure 8:
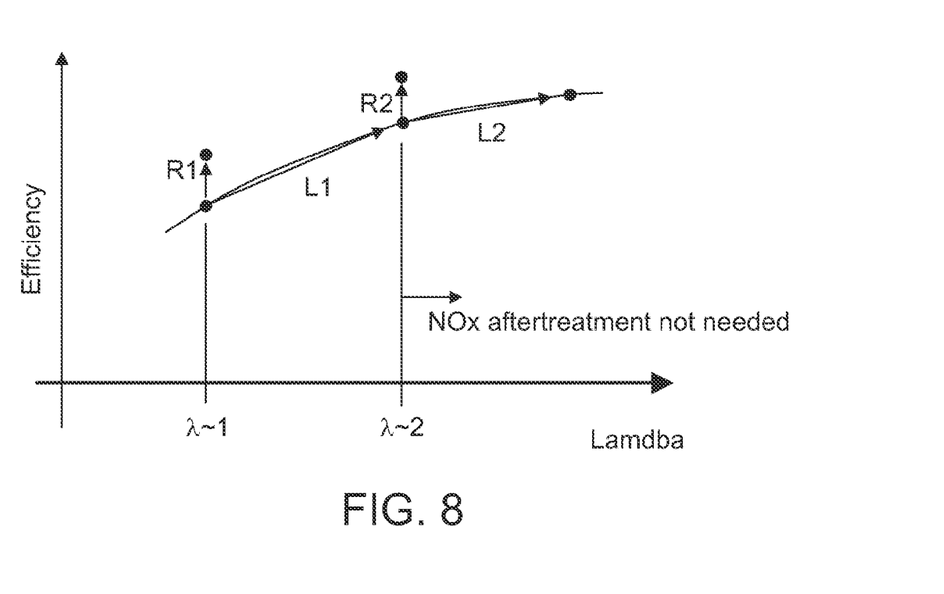
FIG. 8 is a graph of efficiency versus equivalence ratio illustrating paths to highest engine system efficiency with the use of a reformate.

FIG. 8 shows options for increased efficiency through the use of either increased value of lambda (lambda, $\lambda$, is the air/fuel ratio normalized to the air/fuel ratio in stoichiometric operation) with associated increased need of reformate, or increased reformate at the same value of lambda. The engine system efficiency can be first increased through path L1 in FIG. 8, going to the minimum value of lambda that provides sufficient NOx reduction so as to not need NOx aftertreatment. Increased engine system efficiency (at the expense of increased reformate utilization) could be achieved through higher values of excess air, path L2. Alternatively, efficiency can be increased by providing more reformate than needed for combustion stability, with two options. The first option is to provide reformate while operating stoichiometric, as in path R1. A second option is to increase the reformate provided above the minimum for combustion stability, while remaining at the air excess require to avoid aftertreatment ($\lambda$~2) (path R2 in FIG. 8).

Figure 9:
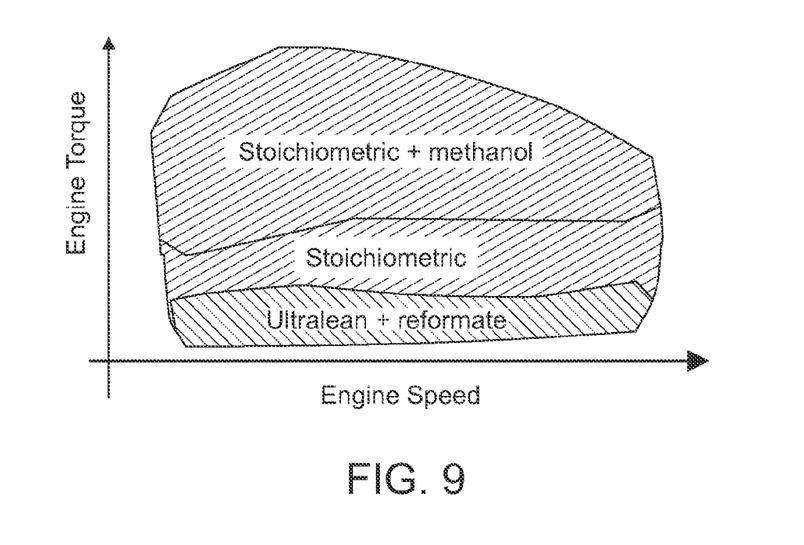
FIG. 9 is a graph of engine torque versus engine speed illustrating control of stoichiometry and methanol for engine operation with moderate methanol consumption and moderate efficiency.

FIG. 9 shows a schematic diagram of an embodiment of the present invention where increased engine system efficiency is provided through the use of lean operation at light loads, enabled by the use of the reformate addition. Limited engine system efficiency gain is achieved by limited use of the reformate, only at light loads and with minimum reformate addition to enable ultra lean operation.

Figure 10:
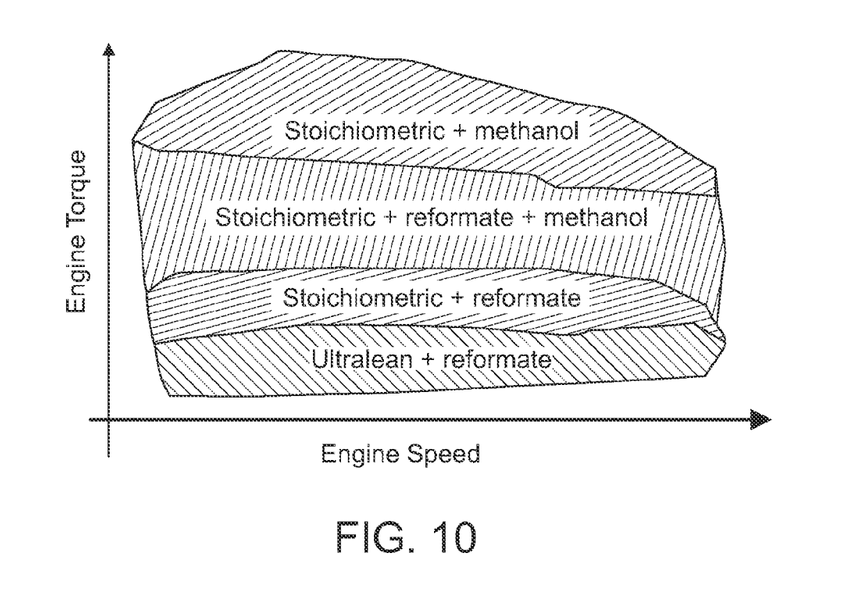
FIG. 10 is a graph of engine torque versus engine speed illustrating control of stoichiometry and methanol for engine operation with highest fuel efficiency but high methanol consumption.

FIG. 10 shows a schematic diagram of the highest efficiency engine possible under the present invention. Maximum reformer addition (limited by the capability of the onboard reformer or the maximum fuel required), is used at all loads with the exception of those that would result in excessive methanol injection to prevent knock. In this case, the efficiency of the engine is maximized, at the expense of substantial methanol consumption.

This invention involves optimized use of a reformer which processes methanol provided from a second fuel tank 24 (FIG. 4) which is separate from a first fuel tank 22 which contains the primary fuel, such as gasoline, natural gas or propane used in spark ignition engines. The engine 30 is operated on a mixture of the reformer 28 products (this reformate is a hydrogen-rich gas which includes hydrogen and carbon monoxide) and primary fuel from the first fuel tank 22. A schematic diagram of the engine system is shown in FIG. 4. The fuel management unit 26 can route the methanol to the reformer 28 where it produces hydrogen-rich gas which is introduced into the engine 30. It can also route the methanol to the engine 30 without transformation in the reformer 28.

Methanol is unique among transportation fuels in that is very easy to reform through thermal decomposition into hydrogen and carbon monoxide. The endothermic thermal decomposition can be accomplished through use of exhaust gas heat without the additional species that are added by partial oxidation. Also when methanol decomposition using the thermal energy of the exhaust gas is employed, energy from the hot exhaust gas is added to the enthalpy of the reformate by the endothermic reforming reaction. The reformer 28 thus operates as a "bottoming cycle" or "regenerative cycle" to capture some of the energy in the exhaust that would otherwise be lost.

The methanol could be in the form of near net methanol, methanol with a co-solvent, methanol-gasoline blends, methanol with water, methanol with an added lubricant or a mixture of some of the above. In the case of methanol-water mixtures, the reforming operation could be thermal decomposition followed by water-shifting reaction. The methanol-water mixture could be in the form of high concentration windshield cleaner.

Although there is very little interest at present in using methanol as a transportation fuel in the United States, there is strong and growing interest in China in using methanol derived from coal. In addition, interest in methanol in the United States may increase due to the ease of making methanol from municipal and industrial waste, agricultural and forestry waste and rapidly growing biomass sources such as switchgrass. Also as discussed below, some of the applications of the invention require only relatively small amounts of methanol and could be provided by presently available methanol from natural gas.

Relative to reforming other fuels, design of a methanol reformer can be greatly simplified and the cost is substantially reduced. The use of decomposed methanol in spark ignition engines has been previously discussed (Adams, Konig). It has also been considered for HCCI engines (Shudo).

An important issue for practical use of this concept is optimal use of the methanol. Methanol is not presently available at service station pumps. Initially it could be supplied by pumps at fleet refueling stations, dealers, garages or quick-oil-change type businesses using small as well as conventional large storage tanks. If the methanol requirement is sufficiently small, it could also be supplied by use of containers. Minimizing any inconvenience from the need to refill the second fuel tank by maximizing the methanol tank refill interval is important for widespread use of this efficiency enhancement technology Even if a methanol pump distribution system for gasoline-methanol flex fuel vehicles is put in place at service stations, optimal use of the methanol from a second tank will provide important efficiency and performance benefits. It will also remove the problem of water induced phase separation of methanol from low concentration methanol—gasoline mixtures in a single tank flexible fuel vehicle.

This invention addresses this issue with a fuel management system which maximizes the efficiency gain for a given amount of methanol that is consumed and enables a range of tradeoffs between efficiency gain and methanol consumption rate.

The fuel management system controls the amount of the engine torque/speed operating space in which an ultra lean air/fuel mixture is used and methanol is consumed in the reformer to produce hydrogen-rich gas. When the engine is operated in ultra lean conditions it is meant that the relative air/fuel ratio, $\lambda$, is sufficiently high that engine out NOx levels are lower than the level needed to meet emission requirements, thus eliminating the need of a lean-NOx catalyst. In order for emissions to be sufficiently low in ultra lean operation, $\lambda$ should be approximately 2 or more.

Ultra lean operation has the greatest impact at low loads where it reduces throttling losses in addition to providing a more favorable ratio of specific heat for thermodynamic efficiency. The engine is operated at a stoichiometric fuel/air ratio when reformate is not present in the engine, and a three way catalyst is used to control NOx emissions. Stoichiometric operation at high loads also provides maximum torque and power.

Use of hot rather than cooled reformate is preferable since it increases flame speed, thereby extending the lean limit and reducing the amount of reformate that must be used to extend the combustion stability limit to $\lambda=2$ or more. This can apply to reformate produced by reforming of fuels other than methanol.

The amount of methanol that is reformed at a given value of engine torque depends upon the hydrogen-rich gas/gasoline ratio that is needed to provide the desired level of lean operation. Since the lean burn limit of methanol itself is higher that that of gasoline or natural gas, it is possible to extend the lean limit by simply injecting methanol, or even methanol/hydrogen-rich gas mixtures from a reformer that is only partly efficient, decreasing the conversion requirements of the reformer.

As discussed in provisional application 60/987,124 stratified injection of hot reformate where the concentration is greatest near the spark plug be used to increase the efficiency gain/methanol consumption ratio. Stratified injection of methanol can also be used to improve the effect of methanol in extending the lean limit.

The amount of efficiency gain that is obtained by reforming of the methanol from the second tank depends on the extent of the engine operation space over which the reformate is used.

Conventional fuel management systems control the stoichiometry of the engine as shown in FIG. 5. The fuel management system for one of the embodiments of the invention is shown in FIG. 6 where the line that separates a first region of reformate use/ultra lean operation from a second region of no reformate use/stoichometric operation is adjusted by the fuel management system. The engine is operated in a relatively low efficiency gain and low methanol drive cycle consumption mode when the fuel management system limits the size of the first region of ultra lean operation to a small fraction of the engine operating space. When the fuel management system increases this region the efficiency gain of the engine system over a drive cycle is increased at the expense of greater methanol consumption, as shown in FIG. 7.

The control of the engine system efficiency gain/methanol consumption tradeoff can be preset. The fuel management system can be operated according to an algorithm for maximizing the efficiency gain/methanol consumption ratio. The amount of methanol that is used can also be controlled by measurement of the amount of methanol in the second tank. Alternatively the efficiency gain/methanol tradeoff can be determined by the driver.

An efficiency gain/methanol use tradeoff can also be made by using more reformate than is needed to enable operation at values of lambda that are greater than needed to meet the minimum value of $\lambda$ needed to keep NOx emissions at an acceptably low level. Operation at higher lambda increases efficiency at the expense of greater methanol consumption.

The engine can also be operated in a mode where reformate is used and the fuel/air ratio is held at a stoichiometric ratio or at levels higher than the minimum needed to provide combustion stability during lean operation, as shown in FIG. 8 (paths R1 and R2). In this case the engine system efficiency benefit is not due to increased lean operation but from the increase in the enthalpy of the reformate that can be obtained in thermal decomposition using exhaust gas heat.

Extending the region where reformate is used to a region of high loads can lead to the problem of knock if hot reformate is used. This problem can be addressed by use of cooled reformate or by simultaneous introduction into the engine 30 of methanol from the second fuel tank 24 to suppress knock as shown in FIG. 4. Methanol is a very effective knock suppression agent in a spark ignition engine. Methanol from the second tank 24 could be introduced into the engine either by port or direct injection. Reformate and methanol from the first tank could be simultaneously introduced into the engine.

Knock suppression at high loads by port or direct injection of liquid methanol from the second tank 24 can also be used to enable high compression ratio operation in an unconventional engine. Operation at high compression ratio (12-14) can increase spark ignition engine efficiency by 4 to 7%. High compression ratio also increases combustion stability and reduces the amount of reformate needed to enable ultra lean operation at a given value of λ. Maximum effect on increasing compression ratio would be obtained by introducing the methanol into the engine without introducing reformate.

FIGS. 9 and 10 show the cases respectively for modest efficiency gain, modest methanol consumption and highest efficiency gain, highest methanol consumption.

When the methanol is also used to enable high compression ratio operation by preventing knock at high loads, the fuel management system can be used reduce the amount of reformer use to insure that vehicle performance is unaffected by exhaustion of the methanol supply and that the methanol tank refill interval is greater than a certain minimum value. While running out of methanol in the secondary tank will not affect vehicle performance (with the exception of engine system efficiency) through its impact on the reformer system, it will affect performance when it is no longer available to prevent knock. If no methanol is available in the second tank, spark retard will be used to prevent knock and maximum torque and power may also be reduced.

When methanol is used as a means to prevent knock at high loads, the fuel management system can reduce or eliminate the amount of methanol that is directed to the reformer. This change in the amount of methanol that is directed to the reformer can be determined by the amount of methanol in the second tank and/or by the rate of methanol consumption. It can also be determined by the driver.

The port or direct injection of methanol can also be used to enable use of increased turbocharging or supercharging without knock.

In addition to the two tank option discussed above, another option for a methanol enhanced engine is for gasoline and methanol to be stored together in one tank and the vehicle is operated as a flex fuel vehicle which operates on varying methanol-gasoline mixtures. In this case, the methanol-gasoline mixture is directed to the reformer only when the methanol faction is above a certain level.

As an alternative to ultra lean operation, the reformate can also be used to enable heavy EGR operation with efficiency gain/methanol use tradeoffs and operation options similar to those for lean operation.

Production of hydrogen-rich gas by methanol decomposition is preferred because of the quality of the hydrogen-rich gas and the use of exhaust gas energy for reforming. An electrically driven reformer is preferred because of the capability for rapid response, especially during start up, and robust operation. This reformer could be a combination of an electrically driven reformer and thermal decomposition reformer. The electrically driven reformer may be a plasma reformer or an electrically heated catalyst reformer. The same device could operate as an electrically-assisted reformer with partial oxidation during startup, while operating as a thermal decomposition reformer (no air) afterwards.

A key requirement for the reformer will be to operate without coking of the catalyst, particularly if the methanol is mixed with gasoline and/or co-solvent. Means to address this issue are discussed in provisional patent application 60/987, 124

The methanol reformer enhanced engine concept can provide a number of options for fuel efficiency improvement over spark ignition engines that do not employ reformer enhanced operation. The largest efficiency improvement, which can be around 20% for city-highway driving, requires substantial methanol consumption (a very rough estimate is around 20% of the gasoline consumption). This would lead to the need for frequent refill of the methanol tank and is thus most suitable for fleet operation. The efficiency gain in fleet vehicles may in fact be greater than 20% due to the large amount of idling and low speed driving. There is a wide range of efficiency gain/methanol consumption tradeoffs.

The methanol reformer enhanced engine concept can be used with a range of different engine types and fuels. Application to naturally aspirated, port fuel injected gasoline engines with conventional compression ratios is attractive because the technology may be used on existing engines as well as new engines. In addition, there would be no decrease in driving performance if methanol were not available. A further increase in the efficiency of naturally aspirated engines (around 4-7%) could be obtained by using the methanol to enable knock free operation with engines with higher compression ratio. The overall efficiency increase could be 20% with a moderate level of methanol use. The methanol reformer enhanced engine technology could also be used to provide a substantial increase to the already high efficiency engine concepts that use turbocharging and direct methanol injection Development of appropriate methanol reformer technology and exhaust treatment control technology (that keeps NOx emissions at a sufficiently low level when transitioning from ultra lean operation to stoichiometric three way catalyst operation) is necessary to realize the benefits of this concept. The use of two port fuel injected fuels and reformate can facilitate the transition fro ultra lean to stoichiometric in fewer engine cycles than an engine with a single fuel. The hydrogen-rich gas can be generated very quickly, and then introduced into the air. The rate of change of the gaseous mixture is determined by the ratio of the volume in the inlet manifold to the air flow rate into the engine. This time constant is small. The two fuels allow control of another variable, the composition of the fuel puddle which exists upstream of the inlet valve with port fuel injected engines. By varying the composition, it is possible to adjust evaporation rates. It may be also possible to temporarily increase the fueling ratio to result in conditions that are fuel rich, and there is a choice of fuels to do so. Methanol has, for example, faster flame speed.

Various engine advances can be used with the methanol reformer enhanced engines, including VVT, VCT, DOD.

The contents of all of the patents, patent applications and references mentioned above are incorporated herein by reference.

In another embodiment port fuel injection is used for the methanol and gasoline is injected by a separate set of port fuel injectors where the port fuel injection of methanol occurs when the inlet valve is open so as to maximize evaporative cooling effects.

The embodiments discussed above can also be utilized with various mixtures of methanol and gasoline in both the first and second tanks and the mixture ratios can be different in the different tanks.

It is recognized that modifications and variations of the invention will be apparent to those of ordinary skill in the art and it is intended that all such modifications and variations be included within the scope of the appended claims.

What is claimed is:

1. A fuel management engine system for a turbo-charged or supercharged spark engine comprising:
    an engine;
    a source of alcohol;
    manifold structure for direct injection of the alcohol into the engine;
    a reformer;
    valve structure for delivering a portion of the alcohol to the reformer for generating a hydrogen-rich gas at lower engine torque values wherein the hydrogen-rich gas is introduced into the engine to extend limit of lean operation; and
    a fuel management control unit operating the engine at a substantially stoichiometric fuel/air ratio during part of a drive cycle and at a lean fuel/air ratio during other parts of the drive cycle.

2. The engine system of claim 1 where at some time in the drive cycle the fuel management control unit establishes an equivalence ratio less than or equal to 0.5.

3. The engine system of claim 1 where at some time in the drive cycle the fuel management control unit controls the reformer to reform more than 30% of the alcohol into the hydrogen-rich gas.

4. The engine system of claim 1 where the reformer uses pyrolytic reforming using heat from exhaust.

5. The engine system of claim 1 including manifold structure for introducing hot reformate into the engine.

6. The engine system of claim 5 where a temperature of the reformate that is introduced into the engine is between 300° and 700° C.

7. The engine system of claim 5 where the hot reformate is only used below a certain level of torque.

8. The engine system of claim 1 where the reformer is a hybrid plasmatron/thermal reformer used during cold start.

9. The engine system of claim 8 where plasma heating in the fuel reformer is reduced or eliminated during only part of reformer operating time.

10. The engine system of claim 1 where the reformer uses pyrolytic reforming.

11. The engine system of claim 1 wherein the reformer is controlled by the fuel management unit to provide the hydrogen-rich gas to assist in engine cold start.

12. The engine system of claim 1 where the compression ratio of the engine is at least 11.

13. The engine system of claim 1 where a three-way catalytic converter is used.

14. The engine system of claim 1 where the engine is fueled with the hydrogen-rich gas using port fuel injection.

15. A fuel management engine system for a turbo-charged or supercharged spark ignition engine comprising:
    an engine;
    a source of ethanol;
    manifold structure for direct injection of the ethanol into the engine;
    a reformer;
    valve structure for delivering a portion of the ethanol to the reformer for generating a hydrogen-rich gas at lower engine torque values wherein the hydrogen-rich gas is introduced into the engine to extend limit of lean operations; and
    a fuel management control unit operating the engine at a substantially stoichiometric fuel/air ratio during part of a drive cycle and at a lean fuel/air ratio during other parts of the drive cycle.

16. The engine system of claim 15, where at some time in the drive cycle the fuel management control unit establishes an equivalence ratio less than or equal to 0.5.

17. The engine system of claim 15 where at some time in the drive cycle the fuel management control unit controls the reformer to reform more than 30% of the ethanol into the hydrogen-rich gas.

18. The engine system of claim 15 where the reformer uses pyrolytic reforming using heat from the exhaust.

19. The engine system of claim 15, including means for introducing hot reformate into the engine.

20. The engine system of claim 19, where a temperature of the reformate that is introduced into the engine is between 300 and 700° C.

21. The engine system of claim 19, wherein the hot reformate is only used below a certain level of torque.

22. The engine system of claim 15, where the reformer is a hybrid plasmatron/thermal reformer used during cold start.

23. The engine system of claim 22, wherein the plasma heating in the fuel reformer is reduced or eliminated during only part of a reformer operating time.

24. The engine system of claim 15 where the reformer uses pyrolytic reforming.

25. The engine system of claim 15 wherein the compression ratio is at least 11.

26. The engine system of claim 15 where a three-way catalytic converter is used.

27. The engine system of claim 15 wherein the engine is fueled with the hydrogen-rich gas using port fuel injection.

* * * * *